United States Patent
Inoue

(10) Patent No.: US 8,094,338 B2
(45) Date of Patent: Jan. 10, 2012

(54) IMAGE PROCESSING DEVICE

(75) Inventor: Toyoshi Inoue, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 1008 days.

(21) Appl. No.: 12/010,238

(22) Filed: Jan. 23, 2008

(65) Prior Publication Data

US 2008/0174816 A1    Jul. 24, 2008

(30) Foreign Application Priority Data

Jan. 23, 2007 (JP) ................. 2007-012185
Nov. 29, 2007 (JP) ................. 2007-308401

(51) Int. Cl.
*H04N 1/00* (2006.01)
*H04N 21/65* (2011.01)
*G06F 3/12* (2006.01)

(52) U.S. Cl. ........ 358/1.15; 358/1.16; 358/1.9; 358/2.1; 358/501; 358/401; 358/403; 709/203

(58) Field of Classification Search ................ 358/1.15, 358/1.16, 1.9, 2.1, 501, 401, 403; 709/203
See application file for complete search history.

(56) References Cited

U.S. PATENT DOCUMENTS

| | | | | |
|---|---|---|---|---|
| 7,123,367 | B1 * | 10/2006 | Kanaya et al. | 358/1.13 |
| 7,852,495 | B2 * | 12/2010 | Martin et al. | 358/1.11 |
| 7,929,162 | B2 * | 4/2011 | Ito et al. | 358/1.15 |
| 2004/0133636 | A1 * | 7/2004 | Kinoshita et al. | 709/203 |
| 2004/0156066 | A1 | 8/2004 | Mishima et al. | |
| 2005/0171914 | A1 * | 8/2005 | Saitoh | 705/51 |
| 2006/0055968 | A1 | 3/2006 | Sato et al. | |
| 2006/0206546 | A1 * | 9/2006 | Komamura et al. | 707/205 |
| 2008/0151288 | A1 * | 6/2008 | Matsunoshita | 358/1.15 |

FOREIGN PATENT DOCUMENTS

| | | |
|---|---|---|
| JP | 8-44549 | 2/1996 |
| JP | 2001-249792 | 9/2001 |
| JP | 2003-143360 A | 5/2003 |
| JP | 2003-337669 A | 11/2003 |
| JP | 2004-227476 A | 8/2004 |
| JP | 2005-014459 * | 1/2005 |
| JP | 2006-053860 * | 2/2006 |
| JP | 2006-067560 A | 3/2006 |
| JP | 2006-285476 A | 10/2006 |

OTHER PUBLICATIONS

JP Office Action dated Sep. 27, 2011, corresponding JP Application No. 2007-308401; English Translation.

* cited by examiner

*Primary Examiner* — King Poon
*Assistant Examiner* — Beniyam Menberu
(74) *Attorney, Agent, or Firm* — Banner & Witcoff, Ltd.

(57) ABSTRACT

An image processing device which can be connected to a document management device storing documents to be managed together with status information representing a status of individual document is provided with a connecting unit configured to connect the image processing device to the document management device, a current status information acquiring unit configured to acquire current status information of a target document, which is to be printed, from the document management device, a print condition setting unit configured to set print condition based on the current status of the target document acquired by the current status information acquiring unit, a printing unit configured to print documents according to a print condition, and a print executing unit configured to make a printing unit to print the target document according to the print condition set by the print condition setting unit.

11 Claims, 10 Drawing Sheets

DMS INFORMATION STORAGE 142

| DMS INFORMATION | |
|---|---|
| MANUFACTURER | FUJ XXXX |
| DMS NAME | Doc XXX |
| VERSION | 4.02 |
| USER | M XXXX KOGYO |

FIG.2A

ACCESS SETTING STORAGE 143

| URL FOR ACQUIRING DMS STATUS INFORMATION LIST | http://documentsystem.net/statuslistget/ |
|---|---|
| URL FOR ACQUIRING CURRENT DMS STATUS INFORMATION | http://documentsystem.net/statusget?docname=****** |

FIG.2B

STATUS INFORMATION LIST STORAGE 144

| STATUS INFORMATION | STATUS COMMENT |
|---|---|
| Writing | CURRENTLY EDITED |
| CheckingSentence | CHARACTERS ARE CHECKED |
| CheckGraphic | GRAPHICS ARE CHECKED |
| Completed | DOCUMENT COMPLETED |

FIG.3A

INITIAL PRINT SETTING STORAGE 145

| STATUS INFORMATION | PRINT CONDITION INITIAL SETTING | | | STATUS COMMENT |
|---|---|---|---|---|
| | COLOR SETTING | PAGE SETTING | MEDIUM | |
| Writing | MONOCHROMATIC | 4 - in - 1 | NORMAL | CURRENTLY EDITED |
| CheckingSentence | MONOCHROMATIC | 2 - in - 1 | NORMAL | CHARACTERS ARE CHECKED |
| CheckGraphic | COLOR | 1 - in - 1 | NORMAL | GRAPHICS ARE CHECKED |
| Completed | COLOR | 1 - in - 1 | GLOSSY | DOCUMENT COMPLETED |
| default | MONOCHROMATIC | 1 - in - 1 | NORMAL | DEFAULT SETTING |

FIG.3B

PRINT DOCUMENT STORAGE 131

| Writing | MONOCHROMATIC | 4 - in - 1 | NORMAL | CURRENTLY EDITED |
|---|---|---|---|---|

FIG.3C

INITIAL PRINT SETTING STORAGE 145

| STATUS INFORMATION | PRINT CONDITION INITIAL SETTING | | | STATUS COMMENT |
| --- | --- | --- | --- | --- |
| | COLOR SETTING | PAGE SETTING | WATERMARK | |
| Public | COLOR | 1 – in – 1 | NONE | LAID OPEN TO PUBLIC |
| OnlyInManager | COLOR | 2 – in – 1 | CONFIDENTIAL | OPEN ONLY TO MANAGER |
| OnlyCompany | MONOCHROMATIC | 2 – in – 1 | ONLY IN COMPANY | FOR IN – COMPANY USE ONLY |
| default | MONOCHROMATIC | 1 – in – 1 | - - - | DEFAULT SETTING |

FIG.10A

PRINT DOCUMENT STORAGE 131

| OnlyInManager | COLOR | 2 – in – 1 | CONFIDENTIAL | OPEN ONLY TO MANAGER |
| --- | --- | --- | --- | --- |

FIG.10B

IMAGE PROCESSING DEVICE

CROSS-REFERENCE TO RELATED APPLICATION

This application claims priority under 35 U.S.C. §119 from Japanese Patent Applications No. 2007-012185 filed on Jan. 23, 2007, and No. 2007-308401 filed on Nov. 29, 2007. The entire subject matters of the applications are incorporated herein by reference.

BACKGROUND

1. Technical Field

The following description relates to an image processing device with which troublesome procedure for changing print settings can be suppressed, and errors in setting a print condition can also be suppressed. The following description also relates to a computer-accessible recording medium storing a program realizing such an image processing device.

2. Related Art

Conventionally, technique for creating status information defining relationship and/or restriction rules among various items in one or plurality of documents, and creating or changing the document based on the status in accordance with the created status information has been known. An example of such technique is disclosed in Japanese patent provisional publication No. HEI 8-44549 (hereinafter, referred to as '549 publication).

SUMMARY OF THE INVENTION

Generally, when documents are printed, regardless of the status information, common print settings are applied as initial settings. For example, when documents are printed, depending on respective stages of "writing," "checking sentences," "checking graphics" and "completed," suitable print condition should be used. At the text proofing stage (i.e., stage of writing or checking sentences), it is sufficient that the document is printed by monochromatic printing. At the color proofing stage (i.e., stage of checking graphics), a color printing is necessary. At the final printing stage (i.e., stage of completed), a high-resolution color printing is required. Conventionally, to meet such a requirement for individual document, the user should change the print condition every time when a print job is executed. Therefore, troublesome print condition setting procedure is required. Further, the user might set the print condition (i.e., print settings to be used for printing) with mistaking the current status of the document to be printed. In such a case, for example, although the text proofing is to be executed and thus the monochromatic printing is sufficient, the user may set the print condition for the color printing.

In consideration of the above problems, the present invention is advantageous in that an improved image processing device is provided, with which the troublesome procedure of setting the print condition can be suppressed, and further, errors in setting the print condition can be suppressed.

According to an aspect of the invention, there is provided an image processing device which can be connected to a document management device storing documents to be managed together with status information representing a status of individual document. The image processing device is provided with a connecting unit configured to connect the image processing device to the document management device, a current status information acquiring unit configured to acquire current status information of a target document, which is to be printed, from the document management device, a print condition setting unit configured to set print condition based on the current status information of the target document acquired by the current status information acquiring unit, a printing unit configured to print documents according to a print condition, and a print executing unit configured to make a printing unit to print the target document according to the print condition set by the print condition setting unit.

According to above configuration, the current status acquiring unit acquires the current status representing the target document that is to be printed, and the print condition setting unit sets the print condition in accordance with the current status of the target document. Therefore, the user need not manually set the print condition suitable to print the target document, and the troublesome setting operation can be avoided. Further, since the appropriate print condition is automatically set, errors in setting the print condition can be avoided.

According to another aspect of the invention, there is provided a computer-readable recording medium containing a program to be executed by an image processing device which can be connected to a document management device storing documents to be managed together with status information representing a status of individual document. The program, when executed, causes the image processing device to perform a step of acquiring current status information of a target document, which is to be printed, from the document management device, a step of setting print condition based on the current status of the target document information acquired by the acquiring step, and a step of controlling a printing unit to print the target document according to the print condition set by the setting step.

By executing the program stored in the recording medium, it becomes unnecessary for the user to manually set the print condition suitable to print the target document. Thus, the user need not perform the troublesome setting operation. Further, since the appropriate print condition is automatically set, errors in setting the print condition can be avoided.

BRIEF DESCRIPTION OF THE ACCOMPANYING DRAWINGS

FIG. 2A shows an example of a configuration of data stored in a DMS information storage, and FIG. 2B is an example of a configuration of data stored in an access setting storage.

FIG. 3A shows an example of a configuration of data stored in a status information list storage.

FIG. 3B shows an example of a configuration of data stored in an initial print setting storage.

FIG. 3C shows an example of a configuration of data stored in a print condition storage.

FIG. 10A shows an example of the print condition initial settings stored in the initial print setting storage using status information different from the embodiment.

FIG. 10B schematically shows a configuration of the print condition storage, in which items prohibited to be changed are indicated with shading.

DETAILED DESCRIPTION OF THE EMBODIMENT

Hereinafter, referring to the accompanying drawings, a printing system 1 according to an embodiment will be described in detail.

Figure 1:
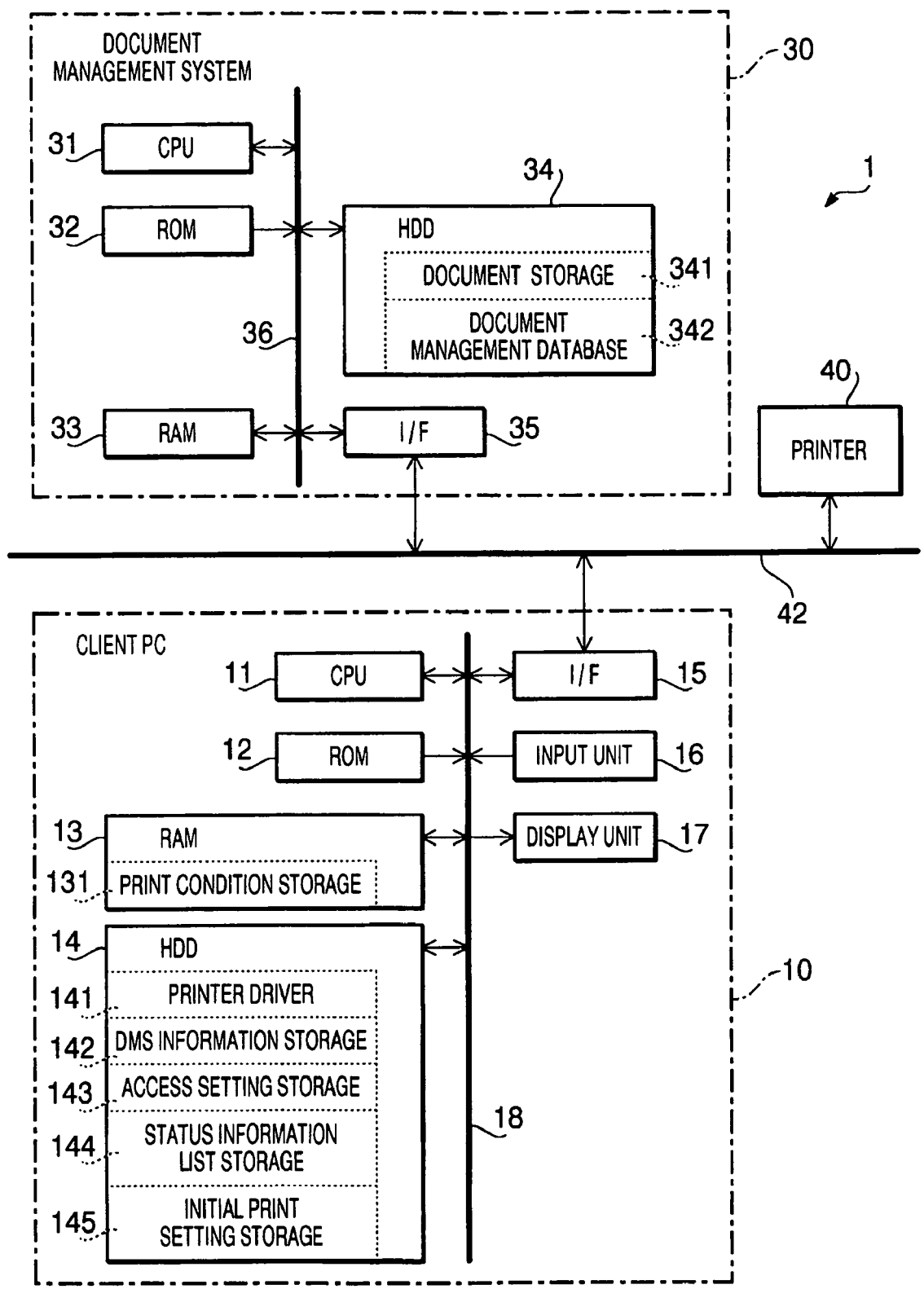
FIG. 1 is a block diagram showing an example of a printing system including a printer and client PCs (Personal Computers).

FIG. 1 shows a block diagram of the printing system 1. As shown in FIG. 1, the printing system 1 includes client PC (Personal Computer), a document management system and a printer.

The client PC 10 executes a printing process (see FIG. 7) to read a document stored (accumulated) in the document management system and controls the printer to print out the document. In this specification, the "document" includes various types of data created with word processing software, spreadsheet software, graphical designing software and the like.

The document management system is a server in which documents are accumulated. In order to manage the stored documents by their types, status information is assigned to each document. According to the embodiment, as an example, a progress of a process of creating a document is categorized in four statuses: "Writing" status, "CheckSentence" status, "CheckGraphic" status and "Completed" status.

The client PC includes, as shown in FIG. 1, a CPU (Central Processing Unit) 11, a ROM (Read Only Memory) 12, a RAM (Random Access Memory) 13 and an HDD (Hard Disk Drive) 14. The client PC 10 is further provided with a Network I/F (Interface) 15 for connecting the client PC 10 to the document management system 30 and printer 40 via a network 42, an inputting unit 16, and a displaying unit 17.

The CPU 11 controls the entire operation of the client PC 10. As described later, the CPU 11 executes the programs which perform processes shown in FIGS. 4 through 8.

The ROM 12 is a non-volatile read-only memory storing various control programs to be executed by the CPU 11, and data necessary for execution of the various control programs.

The RAM 13 temporarily stores data and/or programs for various processes executed by the CPU 11. The RAM 13 is provided with a print condition storage 131, which will be described in detail later referring to FIG. 3C.

The HDD 14 is a data storing device. A printer driver 141 is stored on the HDD 14. The HDD 14 is further provided with a document management system information storage 142 (hereinafter, referred to as DMS information storage 142), an access setting storage 143, a status information list storage 144, an initial print setting storage 145. The printer driver 141 is a program executed by the CPU 11 to perform the processes shown in FIGS. 4-8.

The DMS information storage 142 is a storage area in which information for identifying the document management system 30 is stored. The access setting storage 143 is a storage which contains location information for accessing the document management system 30. The DMS information storage 142 and the access setting storage 143 will be described in detail later referring to FIG. 2.

The status information list storage 144 stores a list of status information used in the document management system 30. The status information list storage 144 will be described in detail later referring to FIG. 3A.

The initial print setting storage 145 stores the status information used in the document management system 30 and the initial settings for a print condition (hereinafter, referred to as initial print condition setting) in a related manner. The initial print setting storage 145 will be described in detail later referring to FIG. 3B.

The network I/F 15 connects the client PC 10 to the network 42 so that data communication between the document management system 30 and the printer 40 or between the client PC 10 and the printer 40, through the network 42 can be performed.

The input device 16 allows a user to input data and/or commands in the client PC 10. The input device 16 includes a keyboard, mouse and the like. The display device 17 is for displaying operational status of the client PC 10, input data and the like, and is composed of a CRT (Cathode Ray Tube) display or an LCD (Liquid Crystal Display).

As shown FIG. 1, the CPU 11, ROM 12, RAM 13, HDD 14, I/F 15, inputting unit 16 and displaying unit are interconnected via a bus line 18.

The document management system 30, which is connected to the client PC 10 via the network 42, is provided with CPU 31, ROM 32, RAM 33, HDD 34, and network I/F 35 for connecting the document management system 30 to the client PC 10 via the network 42.

The CPU 31 controls the entire operation of the document management system 30, and is configured to execute various programs. The ROM 32 stores the programs to be executed by the CPU 31 and the like. The RAM 33 temporarily stores data necessary when the CPU 31 executes various programs.

The HDD 34 is a storage device and has a document storage 341 for accumulating documents and a document management database 342. The document management database 342 is a database for managing names, stored dates, information regarding authors, status information accumulated in the document storage 341. The document management system 30 categorizes the documents accumulated in the document storage 341 by the status information in accordance with the contents of the document management database 342 and manages the documents.

The I/F 35 connects the document management system 30 to the network 42, and controls the data communication between the client PC 10 and the document management system 30 via the network 42.

As shown in FIG. 1, the CPU 31, ROM 32, RAM 33, HDD 34 and I/F 35 are interconnected via the bus line 36.

According to the printing system 1 configured as described above, when one of the documents accumulated in the document management system 30 is designated by the client PC 10 as the document to be printed, the client PC 10 controls the printer 40 to execute the print job for printing the designated document.

Incidentally, although one client PC 10 is connected to the network 42 in FIG. 1, the number of the client PCs 10 connectable to the document management system 30 need not be one, but a plurality of PCs 10 can be connected. Further, the printer 40 may be a printer directly connected to the client PC 10.

FIG. 2A schematically shows a configuration of the DMS information storage 142. As shown in FIG. 2A, the DMS information storage 142 stores DMS information for identifying the document management system 30 that is connected via the network 42. In the following description, explanation is made when a manufacturer of the document management system 30, a name (i.e., DMS name), version, a user and the like are registered as the DMS information. The DMS information are input by the user through the inputting unit 16 when the printer driver 141 is initialized or when the document management system 30 is updated, and registered with the DMS information storage 142.

FIG. 2B schematically shows a configuration of the access setting storage 143. As shown in FIG. 2B, the access setting storage 143 stores "URL (Uniform Resource Locator) for acquiring DMS status information list" and "URL for acquiring current DMS status information." The "URL for acquiring DMS status information list" represents a location for acquiring a list of statuses used in the document management system 30. When the user accesses the "URL for acquiring DMS status information list" with the client PC 10, a list of the status used in the document management system 30 is transmitted to the client PC 10.

The "URL for acquiring the current DMS status information" represents a location at which the status information of the print target document (hereinafter, referred to as the current status information) can be acquired. When the PC 10 accesses the URL with the name of the print target document being added, the document management system 30 at the URL returns the current status information to the client PC 10. Incidentally, the URL for acquiring the DMS status information list, and the URL for acquiring the current DMS status information are input by the user through the inputting unit 16 and registered with the access setting storage 143 when the initialization of the printer driver 141 or updating of the document management system 30 is performed.

FIG. 3A schematically shows a configuration of the status information list storage 144. The status information list storage 144 stores a list of the status information registered with the DMS information storage 142 and used in the document management system 30. By accessing the "URL for acquiring the DMS status information list," the list of the status information used in the document management system 30 is acquired. That is, according to the embodiment, the list indicating the statuses of "Writing," "CheckSentence," "CheckGraphic," and "Completed" are acquired. The acquired statuses are stored in the status information list storage 144.

In the status information list storage 144, status comments respectively indicating meanings of the statuses are stored in a related manner. In the exemplary embodiment, "Writing" status means the document is being edited, "CheckSentence" status means the document is at a stage of proofreading, "CheckGraphic" status means the document is graphically checked, and "Complete" status means creation of the document has been completed.

FIG. 3B schematically shows a configuration of the print initial setting storage 145. The print initial setting storage 145 stores the initial print condition for each of the statuses stored in the status information list storage 144 in a related manner. If the current status information acquired by accessing to the "URL for acquiring the current DMS status," the initial print condition corresponding to the current status information are retrieved from the initial print setting storage 145. The retrieved initial print settings are stored in the print condition storage 131 (see FIG. 3C).

In the following description, explanation is made under presumption that a "color setting" representing whether color print or monochromatic print is to be performed, a "page setting" representing the number of pages printed on a single page of a recording sheet, a "media setting" representing a type of the recording sheet are stored, as the initial print condition, in the initial setting storage 145. As shown in FIG. 3B, for the status "Writing," "monochromatic printing," "4-in-1" (i.e., print four pages of data in a single page of the recording sheet), and "normal sheet" stored as initial print condition. Regarding the document being edited, even if it is to be printed, the purpose of printing is for proofreading, and after the proofread is completed, the recording sheet may be discarded. Therefore, it is very likely that the user intends to print the same in an inexpensive way. Accordingly, for example, when the status information is "Writing," the user may wish to use a print condition which realize inexpensive printing operation. Therefore, for the status information representing "Writing," the print condition realizing an inexpensive print cost is related to. With such a configuration, the inexpensive print condition is automatically set as the initial print condition and thus the user can avoid troublesome operations for changing the print condition, and occurrence of errors in setting the print condition can be suppressed.

In contrast, for the status "Completed," the "color printing," "1-in-1 printing" (i.e., one page of data is printed on one page of the recording sheet), "glossy sheet" are stored in a related manner as its initial print condition as shown in FIG. 3B. When the completed document is printed, the purpose of printing may be a final check of the document or the document may be handed to a client. Therefore, when the status is "Complete," the user may wish that the document is printed in the best condition. Therefore, to the "Complete" status, the high-quality printing condition is related so that the high-quality printing condition is automatically set as the initial setting when the status is "Complete," and user can avoid troublesome procedure for changing the print condition.

Further, as shown in FIG. 3B, in the initial setting storage 145, status information "default setting" which is not included in the status information list storage 144 (see FIG. 3A) is stored in association with an initial print condition therefor. If the acquired current status information (i.e., the status information of the print target document) does not meet any one of the status information stored in the initial print setting storage 145, the initial print condition related to the "default" status is stored in the print condition storage 131. With the configuration, even if the acquired current status represents unidentified information, a predetermined print condition can be set as the initial print condition.

FIG. 3C schematically shows the print condition storage 131. The print condition storage 131 stores the print condition as set. That is, in the print condition storage 131, the initial print condition retrieved from the initial print condition storage 145 is stored initially. Then, if the user intends to make a predetermined changing operation, the initial print condition stored in the print condition storage 131 is modified in accordance with the user's operation. Then, the printer driver 141 controls the printer 40 to print the target document in accordance with the print condition stored in the print condition storage 131.

Next, referring to flowcharts shown in FIGS. 4-8, processes executed by the client PC 10 will be described in detail.

Figure 4:
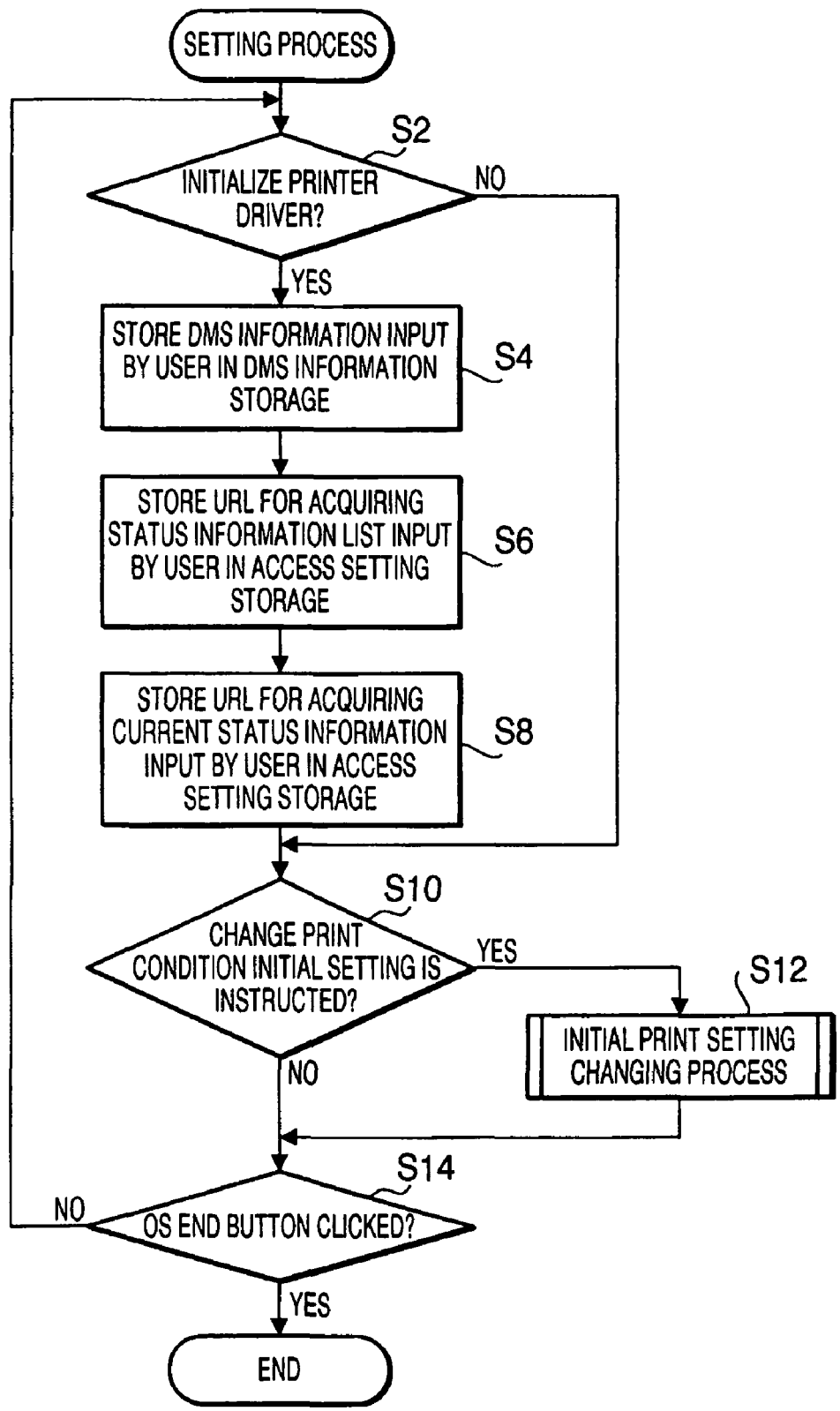
FIG. 4 shows a flowchart illustrating a setting process executed by each client PC.

FIG. 4 is a setting process executed by the client PC 10. The setting process is started when the client PC 10 is powered ON. In S2, the process judges whether an initial setting of the printer driver is to be executed (S2).

When the initial setting of the printer driver is to be executed (S2: YES), the process stores the DMS information input by the user in the DMS information storage 142 (See FIG. 2A) in S4. Then, the process stores the URL for acquiring status information list, which is input by the user, in the access setting storage 143 (see FIG. 2B) in S6, and stores the URL for acquiring current status information, which is input by the user, in the access setting storage 143 (S8).

Next, the process judges whether the user has instructed to execute an initial setting modifying process (S10). If execution of the initial setting modifying process has not been instructed (S10: NO), the process judges whether an END button of the operation system implemented in the client PC 10 is clicked (S14). If the end button of the OS has not been clicked (S14: NO), the process returns to S2, and repeats the steps described above.

While the process repeats the process, if the user instructs to execute the initial setting modifying process (S10: YES), the process executes the initial setting modifying process (S12) which will be described in detail referring to FIG. 5. Then, the process proceeds to S14, and repeats the above steps until the END button of the OS is clicked (S14: NO).

Figure 5:
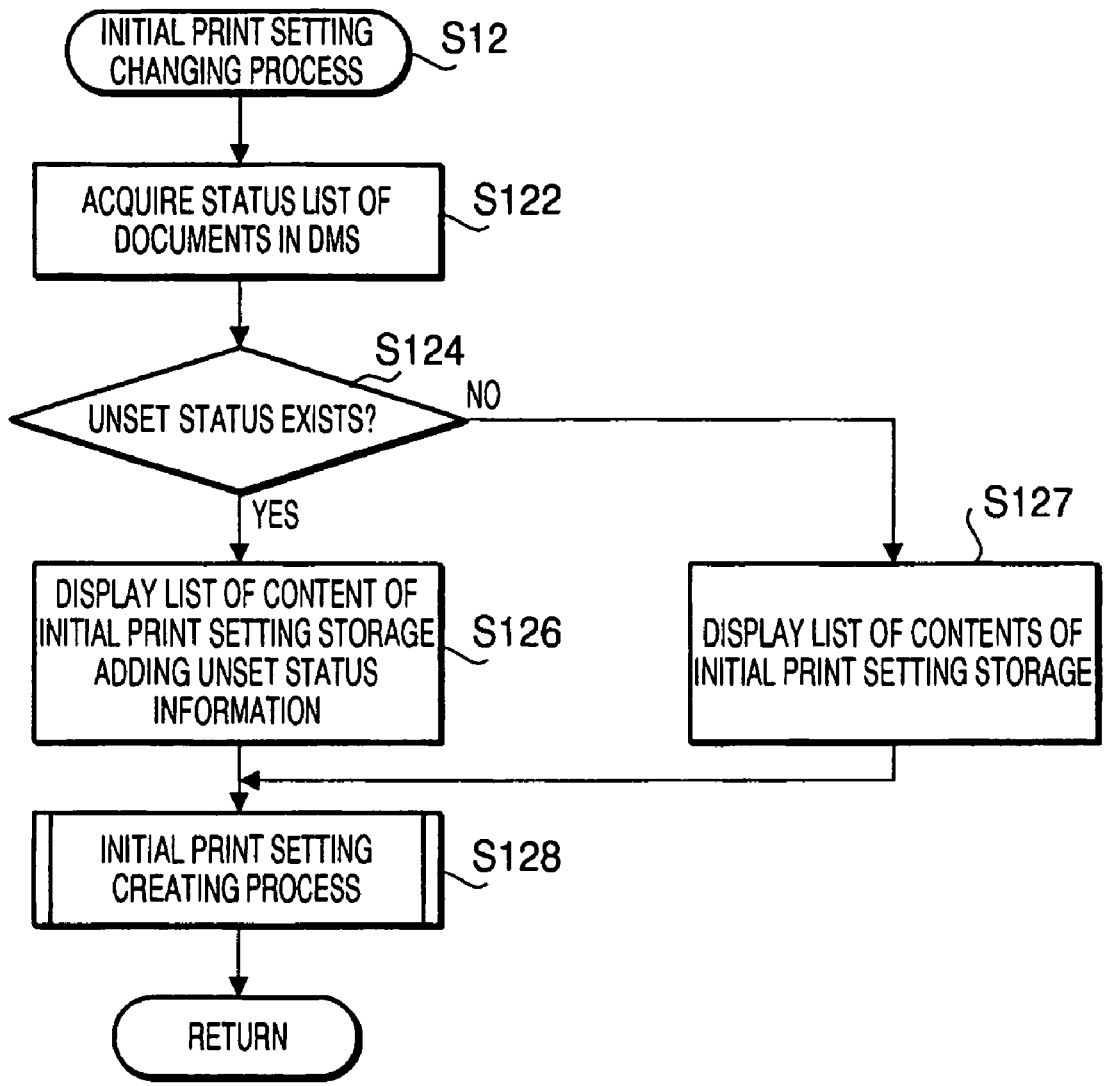
FIG. 5 is a flowchart illustrating an initial print setting changing process according to aspects of the invention.

FIG. 5 shows a flowchart illustrating the initial print setting modifying process. The initial print setting modifying process is a process for newly storing the status information and the initial print condition corresponding to the status information in the initial print setting storage 145 (see FIG. 3B).

When the initial print setting modifying process is started, the process acquires the status information list (S122) and stores the status information list in the status information list storage 144 (see FIG. 3A). Specifically, the process accesses the ULR for acquiring the DMS status information (see FIG. 2B). Then, for the document management system 30 to the client PC 10, the status information list is returned, thereby the process acquiring the status information list.

Next, the process judges whether there is include an unset status information, which has not been stored in the initial print setting storage 145 (see FIG. 3B) within the acquired status information list. If unset status information is included within the acquired status information list (S124: YES), the process adds the unset status information in the initial print setting storage 145, and displays the list on the display unit 17 (S126). At this stage, the initial print condition corresponding to the unset status information is not available. Therefore, on a display screen, the corresponding item is blanked. In contrast, if the acquired stats information list does not include the unset status information (S124: NO), the process displays a list showing contents of the initial setting storage 145 on the display unit 17 (S127).

Next, an initial setting generating process for registering a new initial print condition or modifying the initial print condition which is already registered is executed in S128, and the process is terminated.

According to the initial setting modifying process, even when the status information used by the document management system 30 is changed, or the client PC 10 is connected to a document management system 30 which is different from the previously connected, the contents of the initial print setting storage 145 can be modified in accordance with the document management system 30 after the change.

Figure 6:
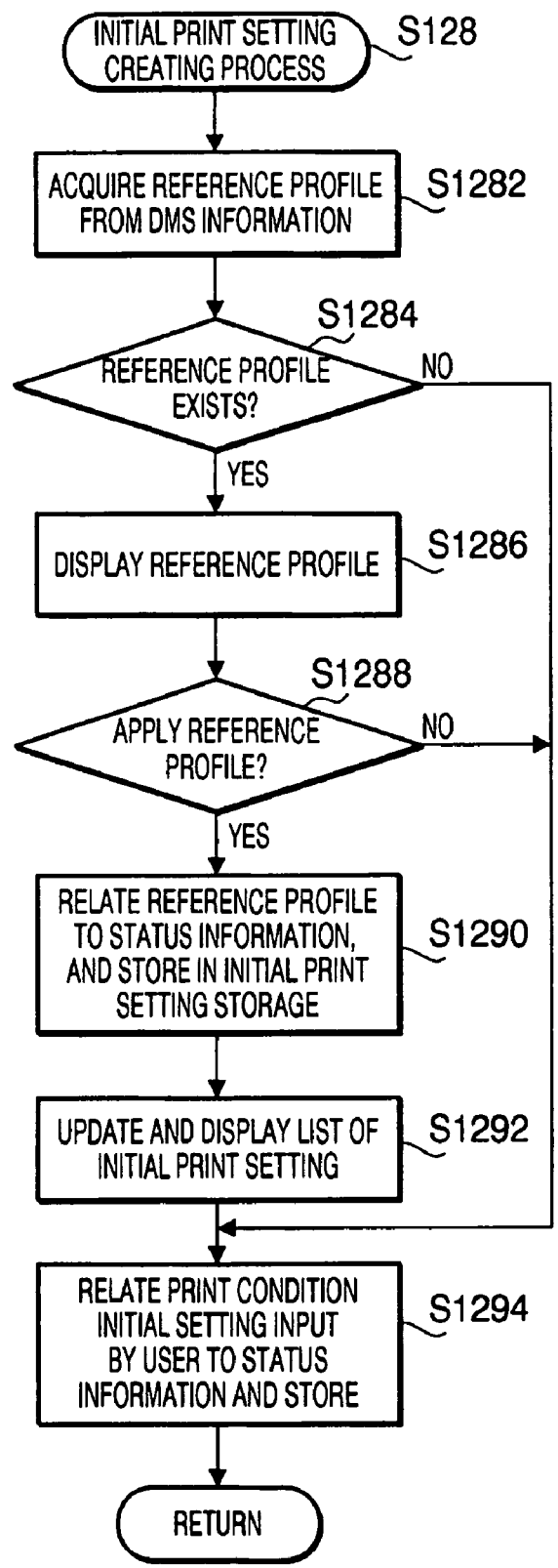
FIG. 6 is a flowchart illustrating an initial setting creating process according to aspects of the invention.

Next, referring to FIG. 6, the initial setting generating process will be described. FIG. 6 shows a flowchart illustrating the initial setting generating process. The initial setting generating process is executed while the contents of the initial print setting storage 145 are displayed on the display unit 17.

In FIG. 6, the process acquires reference profile (S1282) based on the DMS information registered with the DMS information storage 142 (see FIG. 2A). The reference profile is predetermined initial print condition corresponding to each piece of status information. For example, the reference profile is provided by a printer vender (or one who develops and sells the printer driver 141. That is, as to the server, various types of the servers which can be used as the document management system 30 are supplied from various manufactures, and each document management system uses individual status information for managing documents. For example, according to the exemplary embodiment, the document management system 30 categorizes and manages the documents based on the degree of progression of a job. However, another document management system may categorize and manage documents based on the degree of importance. In such a case, completely different status information may be assigned.

To meet the various types of document management systems, according to the exemplary embodiment, when the client PC 10 acquires the reference profile, the client PC 10 firstly identifies the document management system 30 the client PC 10 utilizes referring to the DMS information, and then acquires reference profile corresponding to the status information used in the document management system 30.

Specifically, for example, using the DMS information as a key, the reference profile implemented in the printer driver 141 may be searched for and obtained. Alternatively, printer venders may provides a plurality of kinds of reference profiles to the client PC 10, and the client PC 10 may designate a target reference profile and acquire the same. Further alternatively, the target reference profile may be acquired by designating the URL of the reference profile which is laid open by the printer vender to public on the web site.

Next, the process judges whether a reference profile corresponding to the DMS information is available (S1284). If the reference profile corresponding to the DMS information is not available (S1284: NO), the process asks the user to input the initial print condition. If the initial print condition is input by the user, the process stores the input initial print condition in the initial print setting storage 145 (see FIG. 3B) in association with the status information (S1294), then terminates the initial print setting process.

If there exists a reference profile corresponding to the DMS information (S1284: YES), the process displays the obtained reference profile on the display unit 17 (S1286). Then, the process asks the user whether the reference profile is to be applied (S1288). If the user does not apply the reference profile (S1288: NO), the process asks the user to input the initial print condition. If the initial print condition is input by the user, the process stores the input initial print condition in association with the status information in the print initial setting storage 145 (S1294), the print initial setting creating process is finished.

On the other hand, when the user selects to apply the reference profile (S1288: YES), the process associates the reference profile with the status information, and stores the same in the print initial setting storage 145 (S1290). Then, the process updates the contents of the print initial setting storage 145 which have been displayed in a list on the display device 17 with new contents and displays them (S1292). After that, the process prompts the user to input the initial print condition. When the user inputs the initial print condition, the process associates the initial print condition being input with the status information, stores it in the print initial setting storage 145 (S1294), and terminates the print initial setting creating process.

According to the print initial setting process, for each piece of the status information obtained from the document management system 30, the corresponding initial print condition is created, and stored in the print initial setting storage 145.

Further, for each piece of the status information, a predetermined reference profile is obtained, and if the thus obtained reference profile is stored in the print initial setting storage 145, the initial print condition corresponding to the status information can be created easily.

Next, referring to FIGS. 7 and 8, a case where the user input the print instruction at the client PC 10 will be described.

Figure 7:
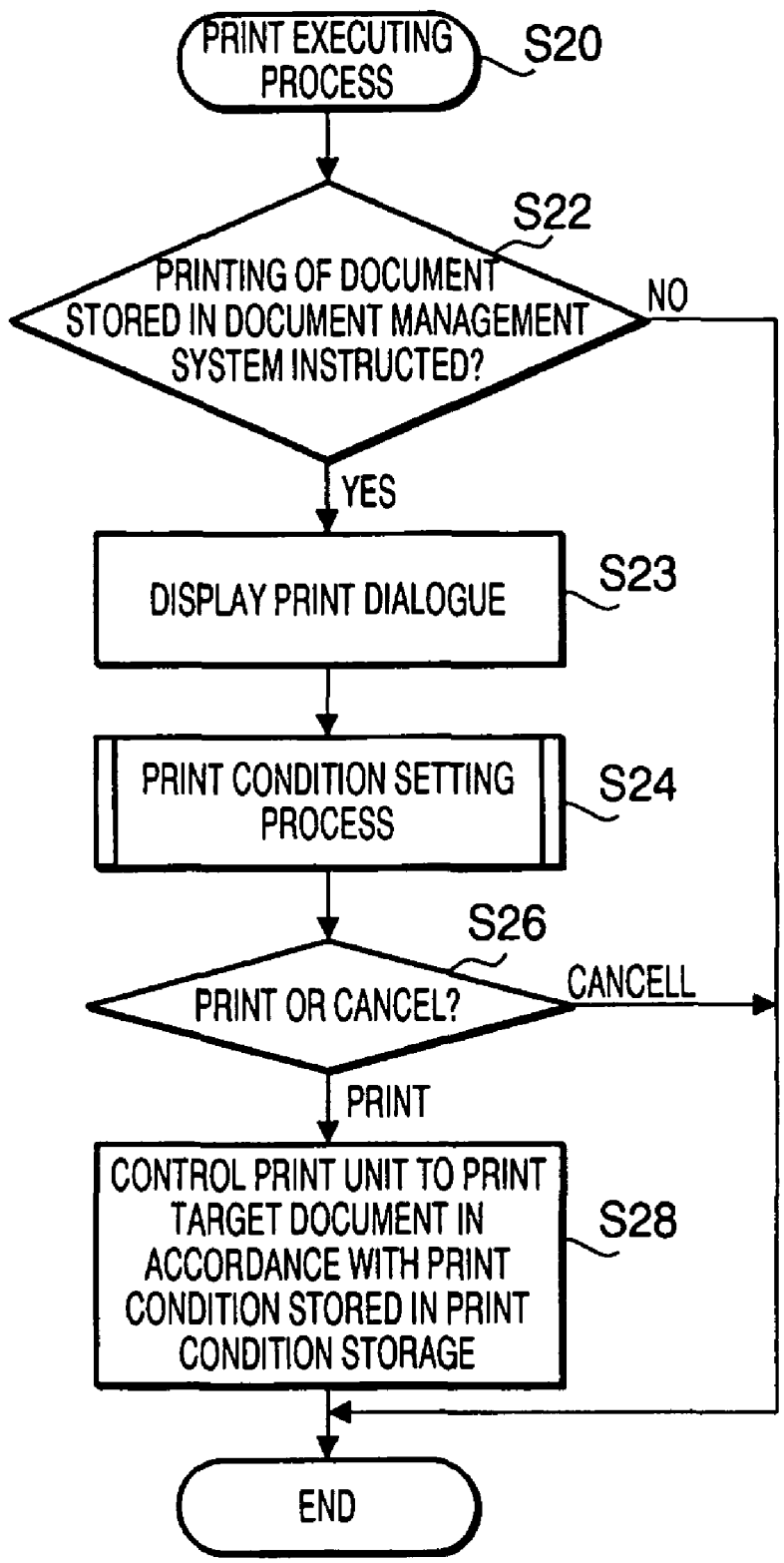
FIG. 7 is a flowchart illustrating a printing process executed by the client PC.

FIG. 7 is a flowchart illustrating the print execution process (S20) executed in the client PC 10. The print execution process (S20) is executed when, at the client PC 10, a document is designated, and further, printing of the designated document is instructed.

First, the process judges whether printing of the document accumulated in the document management system 30 is instructed (S22). If the instruction is not one for printing the document accumulated in the document management system 30 (S22: NO), the process terminates the print execution process. When instruction is to print a document other than the document accumulated in the document management system 30, a well-known printing process is executed, description of which is omitted for brevity.

When printing of the document accumulated in the document management system 30 is instructed (S22: YES), the process displays a print dialogue 171 shown in FIG. 9A (S23).

Figure 9A:
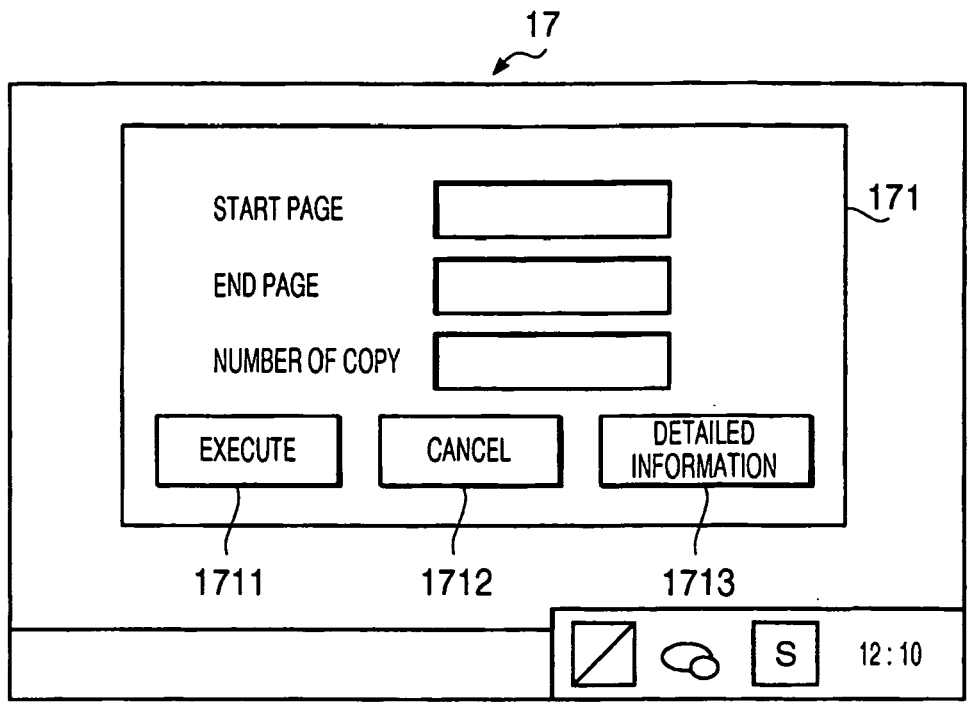
FIG. 9A shows an example of a print dialog displayed on a displaying unit.

FIG. 9A is an example of the print dialogue 171 displayed on the display unit 17. As shown in FIG. 9A, the user can set a printing range by designating the first and last page of the range of the document to be printed, and the number of copies to be printed using the print dialogue 171. Further, in the print dialogue 171, an execution key 1711 to be clicked when the printing with the current setting is executed, a cancel key 1712 to be clicked when the printing is cancelled, and a detail key 1713 to be clicked when the user wishes to check the print condition as set.

FIG. 7 will be further described. The process executes a print condition setting process for setting the print condition in the print condition storage 131 (see FIG. 3C) in S24. The print condition setting process (S24) will be described in detail later, referring to FIG. 8.

Next, the process asks the user whether printing with the current print condition is to be executed or cancelled (S26). If the user clicks the cancel key 1712 in the print dialogue 171 (see FIG. 9A) to select cancellation of printing (S26: Cancel), the print execution process is terminated.

If the execution key 1711 (see FIG. 9A) is clicked by the user and the printing is selected with the current print condition (S26: Execution), the process controls the printer 40 to print the document to be printed in accordance with the current print condition stored in the print condition storage 131 (S28).

Figure 8:
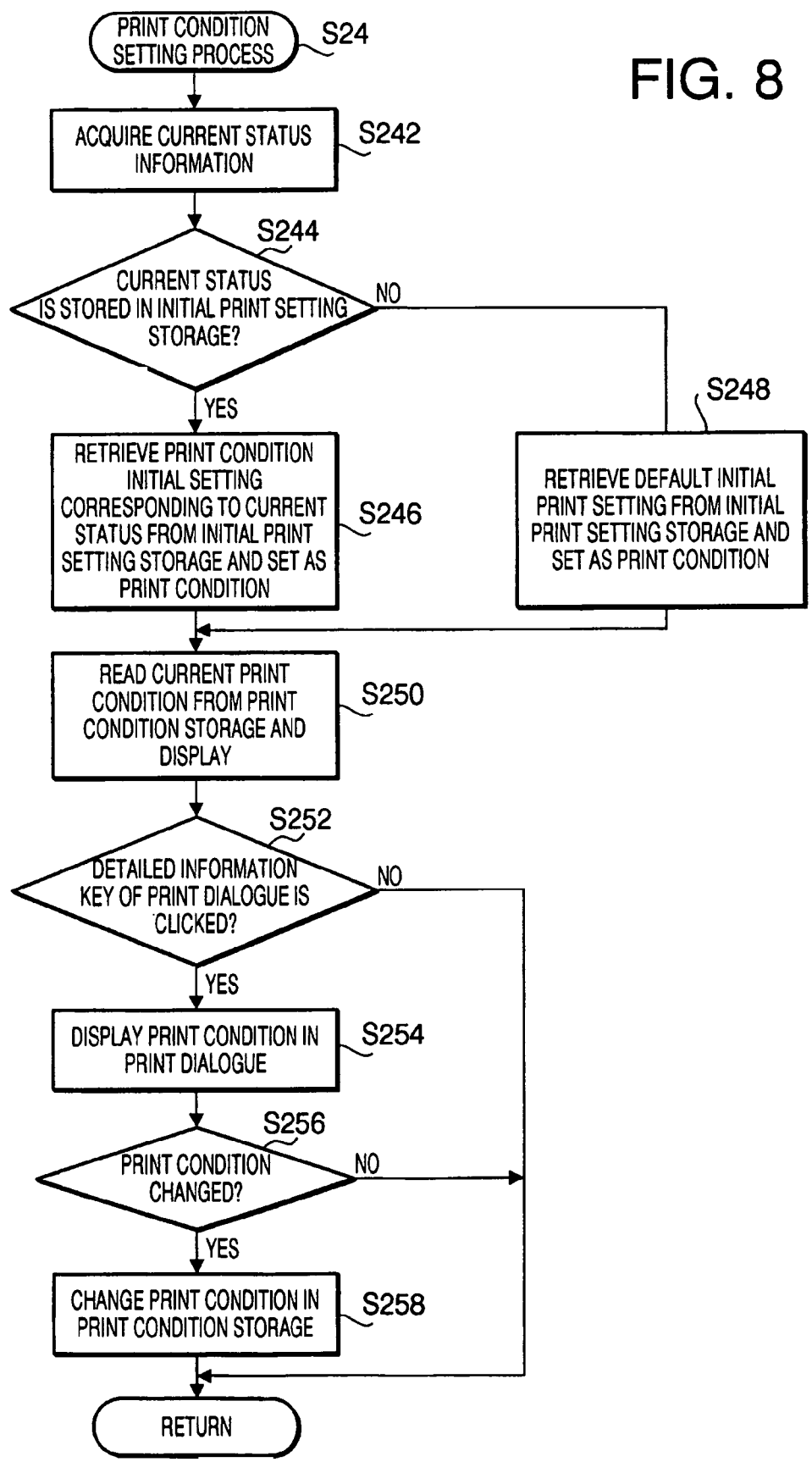
FIG. 8 is a flowchart illustrating a print condition setting process according to aspects of the invention.

FIG. 8 is a flowchart illustrating the print condition setting process (S24). The print condition setting process is a process for setting the print condition using the status of the target document to be printed.

When the print condition setting process is started, the process acquires the current status information (S242). Specifically, the client PC 10 accesses the document management system 30 by adding the name of the document to be printed at the end of the "URL for acquiring the DMS current status information" (see FIG. 2B). Then, from the document management system 30 to the client PC 10, the current status information is returned.

Next, the process judges whether the acquired current status information is stored in the initial print setting storage 145 (S244). If the process determines that the current status information is stored in the initial print setting storage 145 (S244: YES), the process retrieves the initial print condition corresponding to the acquired current status from the initial print setting storage 145 (see FIG. 3B), and set the retrieved setting in the print condition storage 131 as the initial print condition (S246).

If the current status information is not stored in the initial print setting storage 145 (S244: NO), the process retrieves the initial print setting related to the status information of "default" (i.e., the default setting), and stored the default setting in the print condition storage 131 as the initial print condition (S248). As above, even if the acquired current status information is unknown information, the process can set initial print condition in the print condition storage 131.

Next, when the initial print condition retrieved from the initial print setting storage 145 is set (stored) in the print condition storage 131, the process reads the print condition set to the print condition storage 131 and displays the print condition on the display unit 17 (S250).

Figure 9B:
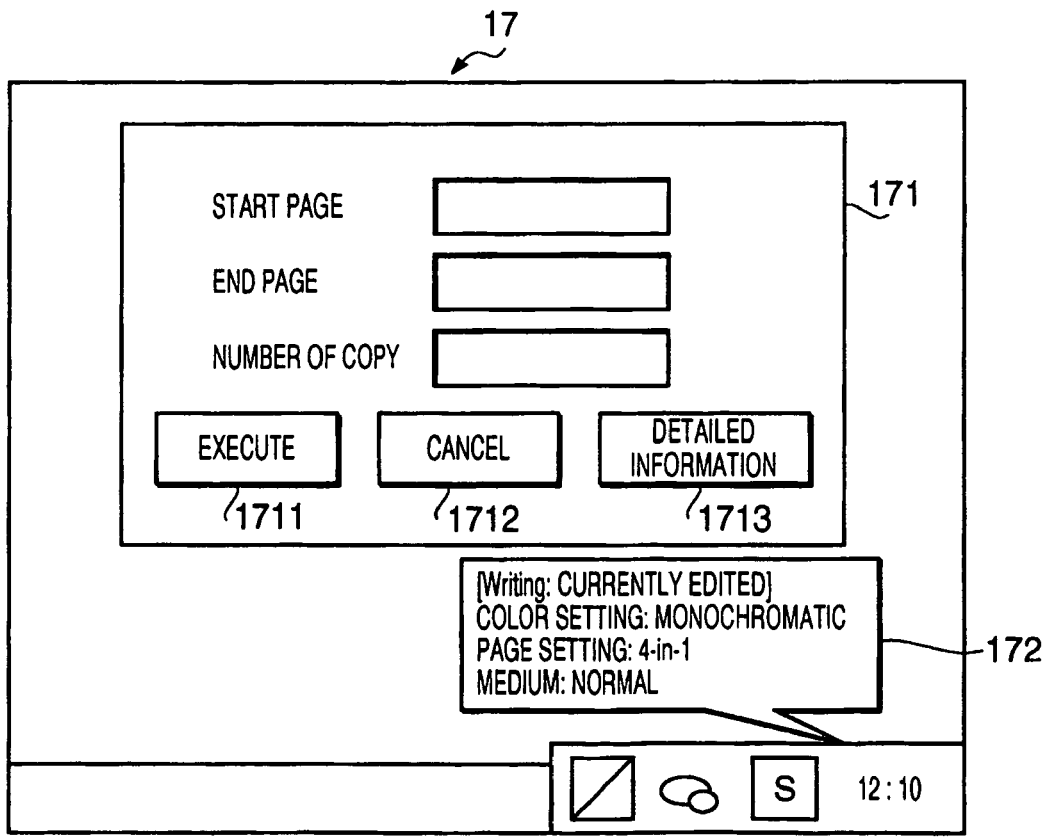
FIG. 9B shows an example of a popup window showing the print setting displayed on the displaying unit.

FIG. 9B show an example of a print condition pop-up window 172 displayed on the display unit 17. As shown in FIG. 9B, on the display unit 17, the print dialogue 171 is kept displayed, and further, at the lower-right corner of the display area of the screen of the display unit 17 of the PC 10, the print condition pop-up window 172 is displayed. With this configuration, the user can recognize the print condition automatically set based on the current status information without operating the detail information key 1713 of the print dialogue 171.

FIG. 8 will be further described. In S252 of FIG. 8, the process judges whether the detailed information key 1713 of the print dialogue 171 is clicked. If the detailed information key 1713 is not clicked (S252: NO), that is, if the user who has reviewed the print condition displayed in the print condition pop-up window 172 judges that the displayed print condition is acceptable, and does not want to change the print condition, the print condition setting process is terminated.

If the detailed information key 1713 is clicked (S252: YES), the process displays the contents of the print condition storage 131, that is, the currently set print condition on the print dialogue 171 (see FIG. 9A) in S254. Then, the process judges whether the user instructs to change the print condition as displayed (S256). If the user does not instruct the change of the print condition (S256: NO), the print condition setting process is terminated. If the user instructs to change the print condition as displayed (S256: YES), the process changes the print condition stored in the print condition storage 131 based on the instruction of the user (S258), then the print condition setting process is terminated.

According to the print condition setting process, the initial print setting corresponding to the current status information can be set to the print condition storage 131. That is, the initial print setting corresponding to the type of the document to be printed is set to the print condition storage 131 initially, it is very likely that the user can utilize the initially set print condition as it is. Therefore, according to this process, troublesome operation for setting the print condition can be reduces, and further errors in setting the print condition can also be suppressed.

Further, the initial print condition read out from the initial print setting storage 145 is set to the print condition storage 131 can be changed based on the user's operation, printing can be executed based on the user's intended print condition.

When the initial print condition read out of the initial print setting storage 145 is set to the print condition storage 131, the initial print condition as set is automatically displayed in the pop-up window on the display unit 17 (see FIG. 9B). Therefore, the user can visually recognize the print condition automatically set based on the current status information without any operation such as an operation to click the detailed information key 1713.

The present invention is described based on the exemplary embodiment. It should be noted that the invention need not be limited to the configuration of the above-described embodiment, and can be modified in various ways without departing from the scope of the invention.

For example, in the exemplary embodiment, the document management system 30 is described to categorize the documents into four progression statuses] "Writing," "CheckSentence," "CheckGraphic," and "Complete." This categorization is only an example of various possible categorizations. The present invention can be applied to any other document management systems which categorize the documents in different ways.

Further, in the exemplary embodiment, as an initial print condition, "color setting," "page setting" and "medium" are indicated to be stored in the initial print setting storage 145 as the print condition initial setting. However, the invention need not be limited to such a configuration. For example, in addition to the above three setting items, a "status print" for setting whether a status comment corresponding to the status information is to be printed can be stored in the initial print setting storage 145. With such a modification, for the status information of "Writing," shown in FIG. 3B, as an setting item of "status print," "YES" (i.e., it is set such that the status comment corresponding to the status information is to be printed), a status comment such as "Writing" is printed on the printed document.

As described above, by printing the status comment indicative of the degree of progression of the document creation on the document, the user can grab, from the printed document, the degree of progression of the document.

It should be noted that, the configuration may be modified such that the status information itself may be printed instead of the status comment.

If "NO" is set to the setting item of "status print," that is, if it is set that the status comment which is stored in relation to the status information is not to be printed, the status comment will not be printed, and a document is printed in accordance with another initial print condition. For example, if the status information is "Completed," it is likely, as aforementioned, the document is distributed to customers. Therefore, as the initial setting of the print condition corresponding to the "status print," "NO" is preferably set.

On the other hand, also mentioned before, the printed document of which the status information is "Completed" may be used for the final check. In such a case, the user may want to have the status comment printed on the document so that the document can be recognized as one for the final check. According to the above configuration, in order to have the status comment printed on the document, the user may change the setting of the "Status print" from "NO" to "YES."

It should be noted that the status comment may be printed as a watermark, or normal text printed in an marginal area of the document. With such a configuration, the status comment will not make the appearance of the printed document worse or deteriorate readability of the document.

As above, since the initial setting of the print condition can be made based on the status information of the document to be printed, errors in setting the print condition can be suppressed. Since the print condition, although automatically set based on the status information, can be changed arbitrarily by the user, the document can be printed in accordance with the user's intent and/or situation where the document is printed.

FIG. 10A shows an example of the initial print condition stored in the initial print setting storage 145 when the client PC 10 is connected to a document management system which manages the documents in accordance with the status information which is different from that of the above-described exemplary embodiment.

If the document management system 30 categorizes the documents based on the confidentiality. That is, the documents are categorized based on the status information of "Public (laid-open to public)," "OnlyInManager," and "OnlyInCompany," as shown in FIG. 10A, the initial print condition corresponding to the above status information is used.

Incidentally, the print condition, "OnlyInCompany" indicated in FIG. 10A is a condition for determining whether the watermark is to be printed. If, for the print condition "OnlyInCompany," an operation to "print confidential" is set, characters "confidential" are printed as the watermark. If, for the print condition "OnlyInCompany," an operation to "print Only In Company" is set, the characters "Only In Company" are printed as the watermark. With such a configuration, for the document of which the high-security is required, the print condition can be initially set such that the watermark is printed.

In the exemplary embodiment, the print condition read out of the initial print setting storage 145 and stored in the print condition storage 131 is changeable in accordance with the user's operation. Instead of such a configuration, part of the print condition stored in the print condition storage 131 may be made unchangeable.

FIG. 10B schematically shows a configuration of the print condition storage 131, in which print conditions which are prohibited from being modified are indicated by shading. For example, if the status information of the document to be printed is "OnlyInManager," as the print conditions "color printing," "2-in-1 (i.e., two-page images are printed in a single page)," "print confidential document," are stored, as the print condition, in the print condition storage 131.

Among such items, for example, "print confidential document" which is a print condition regarding the watermark may be made unchangeable. According to such a setting, on all the documents of which the status information is "OnlyInManager," the characters "confidential document" are always printed as the watermark.

As above, the print condition corresponding to the current status information is set as the initial setting, and further, for part of the print condition, restriction can be made available.

Further, in such a case, as mentioned above, as the initial print condition, the item "status print" for setting whether the status comment related to the status information is to be printed or not can be stored in the initial print setting storage 145. Then, according to the thus stored setting, the status comment may be printed together with the document.

According to the above-described embodiment, based on the current status information, the initial print condition corresponding to the current status information corresponding to the current status information is retrieved and set to the print condition storage 131. This can be modified such that, for example, the initial print condition to be stored in the print condition storage 131 may be selected based on the document to be printed as well as the type of the application used for creating the document to be printed. With such a configuration, not only the current status information but the type of the application can be reflected to set the initial print condition.

The above-described document management system 30 is configured such that a document management database 342 (see FIG. 1) for storing the status information of the documents is provided, and the documents are managed based on the status information stored in the document management database 342. Alternatively, the document management system 30 may be configures such that the accumulated documents are merely apportioned to some folders, and the management is done on the basis of the folders. In such a case, the client PC 10 may acquire the name of the folder which contains the document to be printed as the current status information, and set the print condition according to the thus obtained current status information.

What is claimed is:

1. An image processing device which is connectable to a document management device storing documents to be managed together with status information representing a status of an individual document, comprising:
   a processor;
   a printing unit configured to print documents according to a print condition;
   storage including an initial print setting storage which stores a plurality of pieces of status information and initial settings of print conditions corresponding to the plurality of pieces of status information, respectively;
   a connecting unit configured to connect the image processing device to the document management device; and
   memory storing computer-readable instructions that, when executed, cause the processor to provide:
      a request unit configured to request status information from the document management device;
      an available status acquiring unit configured to acquire a plurality of pieces of the requested status information from the document management device, the plurality of pieces of status information being requested by the request unit and used by the document management device;
      an initial print setting creating unit configured to create an initial setting for each of the plurality of pieces of status information acquired from the document management device by the available status acquiring unit and further configured to store the created initial setting in the initial print setting storage;
      a current status information acquiring unit configured to acquire current status information of a target document, which is to be printed, from the document management device;
      a print condition setting unit configured to set a print condition based on the current status information of the target document acquired by the current status information acquiring unit the print condition setting unit including an initial setting unit configured to retrieve an initial print setting corresponding to the current status information acquired by the current status information acquiring unit from the initial print setting storage and further configured to set the retrieved initial print setting as the print condition to be used; and
      a print executing unit configured to make the printing unit print the target document according to the print condition set by the print condition setting unit.

2. The image processing device according to claim 1, wherein the memory stores additional computer-readable instructions that, when executed, further cause the processor to provide a predetermined setting acquiring unit configured to acquire a predetermined setting for each of the plurality of pieces of status information acquired by the available status acquiring unit; and
   wherein the storage further includes a predetermined setting storing unit configured to store the predetermined setting acquired by the predetermined setting in the initial print setting storage.

3. The image processing device according to claim 1, wherein the memory stores additional computer-readable instructions that, when executed, further cause the processor to provide a current status judging unit configured to judge whether the current status information acquired by the current status information acquiring unit is stored in the initial print setting storage,
   wherein the initial print setting storage stores a default setting which is to be used as the print condition if the current status judging unit judges that the current status information is not stored in the initial print setting storage, and
   wherein the initial setting unit sets the default setting as the print condition if the current status judging unit judges that the current status information is not stored in the initial print setting storage.

4. The image processing device according to claim 1, wherein the print condition setting unit includes an initial setting changing unit configured to change at least part of the print condition set by the initial setting unit in accordance with an operation of a user.

5. The image processing device according to claim 1, wherein the print condition setting unit includes an initial setting displaying unit configured to display the initial setting retrieved from the initial print setting storage if the retrieved initial print setting is set as the print condition.

6. The image processing device according to claim 1, wherein the document management device stores a document management database which includes the status information of the documents, the documents being managed in accordance with the stored status information.

7. The image processing device according to claim 1, wherein the print execution unit controls the printing unit to print the target document together with information identifying the status of the target document based on the current status information of the target document acquired by the current status acquiring unit.

8. The image processing device according to claim 1, wherein the status information represents a plurality of stages of progression in creating each document.

9. The image processing device according to claim 1, wherein the status information represents a plurality of types of confidentiality.

10. A non-transitory computer-readable medium having computer-readable instructions stored thereon that, when executed by an image processing device which is connectable to a document management device storing documents to be managed together with status information representing a status of an individual document, cause the image processing device to:
    request status information from the document management device;
    acquire a plurality of pieces of the requested status information from the document management device, the plurality of pieces of status information being used by the document management device;
    create an initial setting for each of the plurality of pieces of status information acquired from the document management device;
    store the plurality of pieces of status information and the created initial settings of print conditions corresponding to the plurality of pieces of status information, respectively, in an initial print setting storage;
    acquire current status information of a target document, which is to be printed, from the document management device;
    retrieve an initial print setting corresponding to the acquired current status information;
    set a print condition based on the acquired current status information of the target document and the retrieved initial print setting; and control a printing unit to print the target document according to the set print condition.

11. A method, comprising:

requesting, by an image processing device, status information from a document management device;

acquiring, by the image processing device, a plurality of pieces of the requested status information from the document management device, the plurality of pieces of status information being used by the document management device;

creating, by the image processing device, an initial setting for each of the plurality of pieces of status information acquired from the document management device;

storing, by the image processing device, the plurality of pieces of status information and the created initial settings of print conditions corresponding to the plurality of pieces of status information, respectively, in an initial print setting storage;

acquiring, by the image processing device, current status information of a target document, which is to be printed, from the document management device;

retrieving, by the image processing device, an initial print setting corresponding to the acquired current status information;

setting, by the image processing device, a print condition based on the acquired current status information of the target document and the retrieved initial print setting; and causing, by the image processing device, a printing unit to print the target document according to the set print condition.

* * * * *